May 19, 1942. H. C. SIMONSEN 2,283,824
SHEARING MACHINE
Filed Sept. 26, 1940
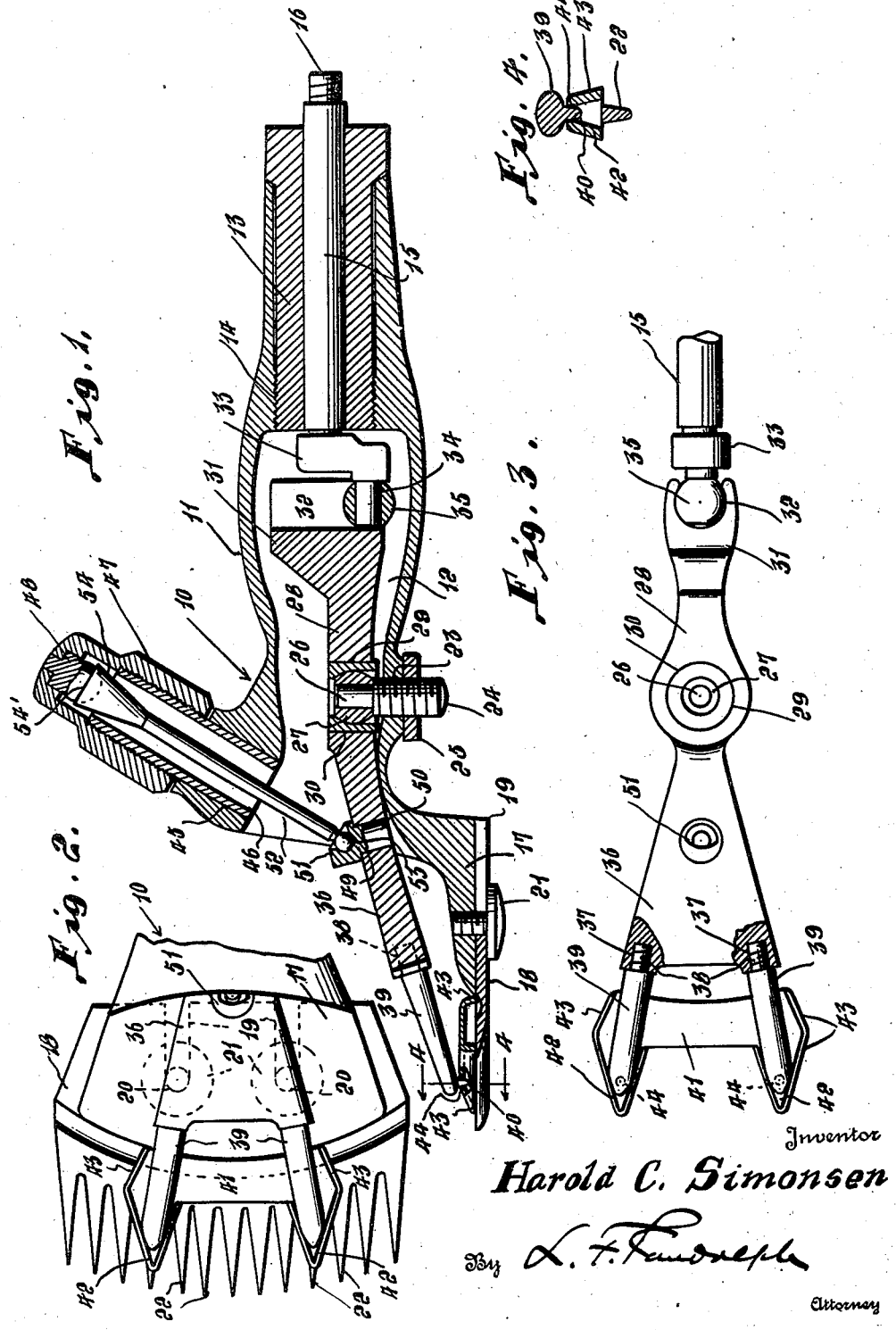
Inventor
Harold C. Simonsen Patented May 19, 1942

2,283,824

UNITED STATES PATENT OFFICE 2,283,824

SHEARING MACHINE

Harold C. Simonsen, Monroe, Utah, assignor of one-half to Albert A. Evans, Monroe, Utah Application September 26, 1940, Serial No. 358,544

2 Claims. (Cl. 30—221)

This invention relates to an improved two point shearing machine especially designed for sheep shearing and aims to provide a cutter of the clipper type including a stationary cutter bar or comb and a reciprocating cutter bar.

More particularly, it is an aim of the invention to provide a sheep shearing machine having a reciprocating cutter provided with a pair of cutting teeth for cooperating with a plurality of teeth on a stationary cutter bar and having means for applying pressure to the teeth directly for providing the proper tension thereon.

Still another aim of the invention is to provide a device of simple construction including a universally mounted arm oscillated by means of a driven cam member for reciprocating the movable cutter and provided with means for urging one end of the arm downwardly and into engagement with the teeth of the movable cutter for holding the movable cutter in position on a stationary cutter bar or comb.

Other objects and advantages of the invention will hereinafter become more fully apparent from the following description of the drawing, which illustrates a preferred embodiment thereof, and wherein:

Figure 1 is a longitudinal, substantially central vertical sectional view, partly in elevation, of the shearing machine, Figure 2 is a fragmentary top plan view of the forward end of the same, Figure 3 is a top plan view, partly in section, of the reciprocating arm which connects the driven cam shaft to the reciprocating cutter, and Figure 4 is an enlarged sectional view taken substantially along the plane of the line 4—4 of Figure 1.

Referring more particularly to the drawing, wherein like reference characters designate like or corresponding parts throughout the different views, 10 designates generally the sheep shearing machine including a housing 11 which is provided with a bore or recess 12 which extends longitudinally therethrough and in the rear end of which is mounted at bushing 13 by means of the threaded connection 14. A cam shaft 15 is journaled in the bushing 13 and is provided with a restricted threaded end 16, disposed exteriorly of the bushing 13 and which is adapted to be connected to a driven shaft, not shown, preferably of the flexible type.

The housing 11 is provided with a downwardly offset flared forward end 17 which extends beyond the forward end of the bore 12 and which is provided with a substantially flat under side against which is disposed a stationary toothed cutter or comb 18 the base portion of which is provided with slots 19 which open outwardly of the back edge thereof. The portion 17 is provided with threaded openings 20 to receive the headed screws 21 which extend through the slots 19 for securing the cutter bar 18 to the under side of the portion 17. It will be obvious that by loosening the screws 21 the cutter bar 18 may be projected or retracted relatively to the portion 17 and secured thereto in any one of a plurality of adjusted positions. The stationary cutter bar or comb 18 is provided with a plurality of forwardly projecting tapered teeth 22 the upper sides of the opposite ends of each of which are sharpened for a purpose which will hereinafter become apparent.

Housing 11 is provided with a threaded opening 23 in its under side which opens into the bore 12 adjacent the forward end thereof and in which is mounted a screw 24 which is provided with a lock nut 25 on its lower end for engaging the under side of the housing 11 for retaining the bolt 24 in adjusted positions relatively to the bore 12. The bolt 24 is provided at its upper end with a restricted shank 26 on which is rotatably and removably mounted a ball shaped member 27. An arm 28 is partially disposed within the forward portion of the bore 12 and is provided intermediate of its ends with an opening 29 to receive an insert 30 having a downwardly opening socket in which is mounted the ball shaped member 27 to universally mount the arm 28 to permit it to swing either horizontally or vertically. The arm 28 at its inner end is provided with an upwardly enlarged portion 31 which is provided with an outwardly or rearwardly opening recess or slot 32 which extends from the top to the bottom thereof and which is arcuately shaped in cross section, as best seen in Figure 3. A crank 33 is secured to the inner end of the shaft 15 and is provided at its free end with an outwardly projecting stub shaft 34 on which is rotatably mounted a ball shaped member 35 which is disposed in the slot or recess 32 and which is slidably mounted therein to oscillate the arm 28 when the shaft 15 is revolved.

The arm 28 is provided with an opposite, forward end which projects from the forward end of the bore 12 and which diverges from adjacent the insert 30. The forward end 36 is provided with a pair of spaced outwardly opening threaded recesses 37 to receive the threaded shanks 38 of a pair of fingers 39 which are thereby removably connected to the arm 28 and which project from its end 36 in diverging relationship relatively to one another. The fingers 39, at their free ends, are provided with downwardly projecting tapered studs 40.

A reciprocating cutter bar 41 is loosely mounted on the stationary cutter bar 18 and is provided at each end thereof with a forwardly extending tapered tooth 42 the side edges of which teeth are sharpened to cooperate with the sharpened edges of the teeth 22 to form clippers, as will hereinafter become apparent. As best seen in Figure 2, the sharpened side edges of the teeth 42 are obliquely disposed relatively to the sharpened edges of the teeth 22 so that when the cutter bar 41 is reciprocated over the cutter bar 18 the teeth 22 and 42 will combine to produce a shearing cut. As best seen in Figure 1, the cutter 41 is provided with a downwardly projecting marginal flange 43 the lower edge of which forms a bearing surface for slidably engaging the upper side of the cutter bar 18. The teeth 42 are each provided with an opening 44, as best seen in Figures 1 and 4, to receive a stud 40 so that each of the fingers 39 rests on and is connected to a tooth 42.

The housing 11 is provided with an upwardly and rearwardly inclined passage or opening 45 adjacent its forward end in which is mounted the lower end of a sleeve 46, the upper end of which is externally threaded to receive the open, threaded end of a socket 47. Socket 47 is provided with an insert 48 in its opposite, upper end. The arm 28, forwardly of the insert 30, is provided with an opening 49 to receive the shank portion 50 of an upwardly and rearwardly opening socket 51. A rod 52 is provided with a restricted lower end on which is formed a ball 53 which is loosely mounted in the socket 51 and is provided at its opposite, upper end with an enlarged upwardly opening socket 54 to receive a ball 54' which is disposed in the socket 47 and forms a part of the insert 48. The rod 52 extends through the sleeve 46 and functions to urge end 36 and the arm 28 downwardly to hold the fingers 39 in engagement with the cutter bar 41. The sockets 51 and 54 open upwardly and are adapted to hold a lubricant in which balls 53 and 54' work to prevent the parts from heating.

From the foregoing it will be obvious that when the shaft 15 is revolved the crank 33 will be revolved for oscillating the arm 28 to thereby oscillate the cutter bar 41 relatively to the comb or cutter bar 18 to cause the teeth 42 to move over the teeth 22 to produce a shearing cut. By screwing down on the cap 47 the pressure of the fingers 39 on the teeth 42 can be increased to cause them to press down sufficiently on the teeth 22 to produce a proper cutting operation, or if necessary, the cap 47 can be turned in the opposite direction for diminishing the pressure on the teeth 42. It will be noted that the fingers 39 bear directly on the teeth 42 so that the frictional engagement between the cutters 18 and 41 will be at the point where the teeth 42 and 22 contact for accomplishing the best results in the cutting operation. The comb or cutter bar 18 may be projected or retracted relatively to the portion 17, as previously explained, for adjustably positioning its teeth 22 relatively to the teeth 42. By unscrewing cap 47 end 36 of arm 28 may be raised to release the cutter 41 which can then be lifted off of the bar 18 for replacement or sharpening due to the fact that the ball and socket connection 27, 30 permits the arm 28 to be swung horizontally or vertically.

Various modifications and changes are contemplated and may obviously be resorted to as only a preferred embodiment of the invention has been disclosed.

I claim as my invention:

1. A cutter comprising a housing, a stationary cutter blade detachably and adjustably connected to said housing and projecting from one end thereof, an arm swingably mounted intermediate of its ends in said housing, driven cam means for oscillating said arm, a reciprocating cutter loosely mounted on said stationary cutter bar, one end of said arm extending from the housing, fingers detachably mounted in said end of the arm and provided with depending studs for engaging said reciprocating cutter, a rod having a ball shaped end, a socket in said arm adjacent the aforementioned end thereof for receiving the ball shaped end of the rod, an upwardly opening socket on the opposite end of the rod, an adjustable socket, forming a part of said housing for receiving the last mentioned end of the rod, and an insert in said adjustable socket provided with a ball shaped portion for engaging the socket end of the rod for holding the fingers in engagement with the reciprocating cutter.

2. An animal shears of the type provided with a housing having a fixed cutter and a movable cutter disposed on the fixed cutter, an arm universally mounted intermediate of its ends in the housing and connected at one end to cam means for oscillating the arm and connected at its opposite end to said movable cutter in a manner to bear thereon; comprising a sleeve disposed in the upper part of the housing and opening inwardly and outwardly thereof, said sleeve having an upper exposed and externally threaded end, an internally threaded cap adjustably connected to the threaded end of the sleeve, said cap having a ball element projecting inwardly and downwardly from its upper, closed end, said arm having an upwardly opening socket adjacent its last mentioned end, and a rod having a ball-shaped end for engaging said socket, the opposite upper end of the rod being provided with an upwardly opening socket portion for engaging said ball element, said rod and ball and socket connections combining with the adjustable cap to adjustably hold the last mentioned end of the arm in engagement with the movable cutter.

HAROLD C. SIMONSEN.